United States Patent [19]

Zintel et al.

[11] 4,216,670
[45] Aug. 12, 1980

[54] HYDRAULIC VIBRATION BRAKE PARTICULARLY FOR USE IN NUCLEAR POWER PLANTS

[75] Inventors: Jakob Zintel, Hüttenfeld; Rudolf Zipser, Darmstadt, both of Fed. Rep. of Germany

[73] Assignee: Babcock-Brown Boveri Reaktor GmbH, Mannheim, Fed. Rep. of Germany

[21] Appl. No.: 959,545

[22] Filed: Nov. 13, 1978

[30] Foreign Application Priority Data

Nov. 12, 1977 [DE] Fed. Rep. of Germany ....... 2750737

[51] Int. Cl.² .......................................... G01M 3/26
[52] U.S. Cl. .............................................. 73/46
[58] Field of Search ................ 73/46, 49.8, 40, 47

[56] References Cited

U.S. PATENT DOCUMENTS

| 3,041,834 | 7/1962 | Davies et al. | 73/46 X |
| 3,362,215 | 1/1968 | Weinstock | 73/47 |
| 3,987,663 | 10/1976 | Repella | 73/46 |

Primary Examiner—Gerald Goldberg
Assistant Examiner—Joseph W. Roskos
Attorney, Agent, or Firm—D. Anthony Gregory; R. J. Edwards

[57] ABSTRACT

A hydraulic vibration brake for use in nuclear power plants is shown. The brake has a casing that a piston divides into two chambers. A storage tank in hydraulic fluid communication through appropriate conduits and valves maintains proper pressure in the system. The piston rod penetrates the casing wall and, at this penetration has a seal which arrests fluid leakage. In this manner, no hydraulic fluid is lost at the seals and sufficient fluid always is available to enable the brake to carry out its function, thereby eliminating the need for a number of burdensome inspections.

9 Claims, 1 Drawing Figure

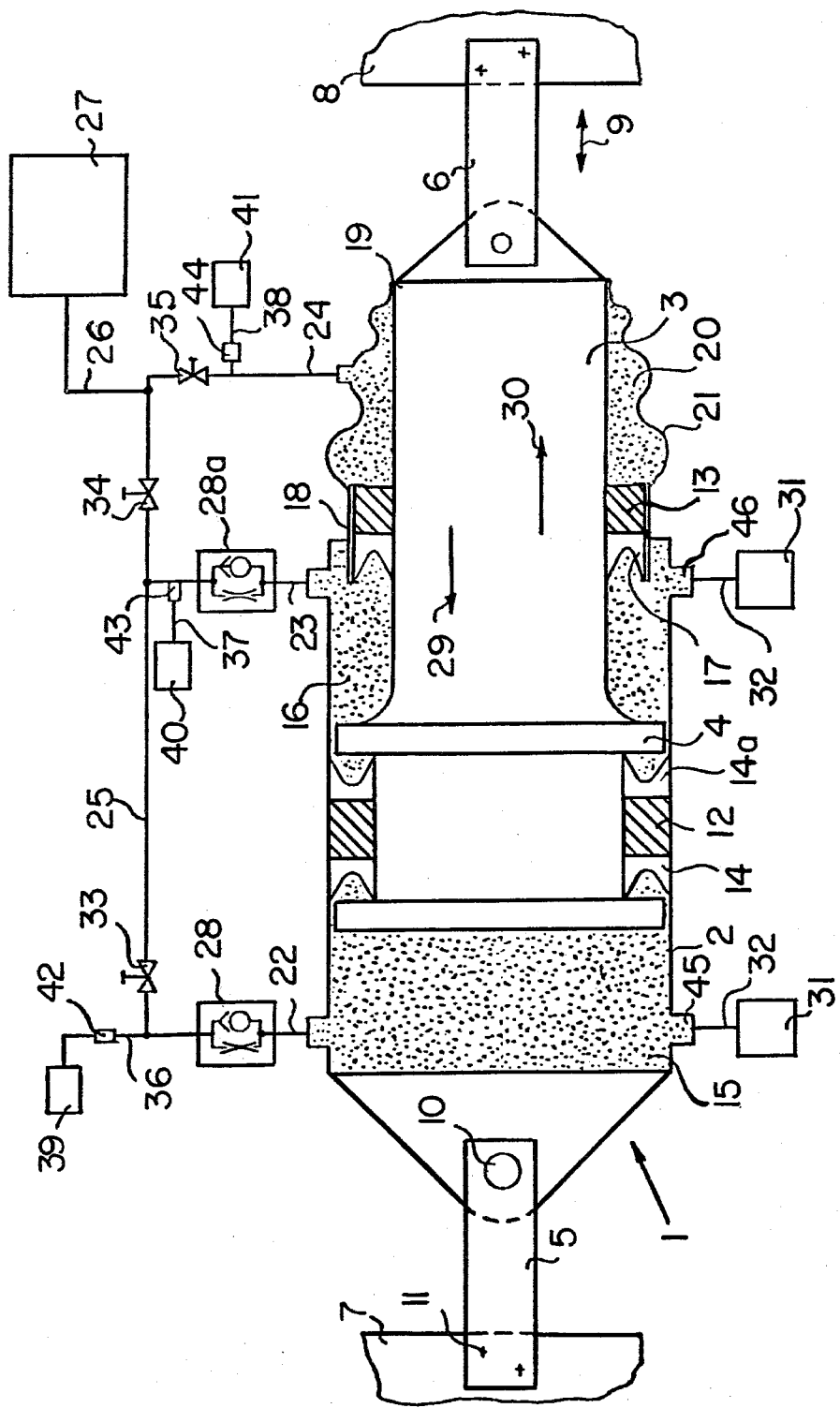

HYDRAULIC VIBRATION BRAKE PARTICULARLY FOR USE IN NUCLEAR POWER PLANTS

This study concerns a hydraulic vibration brake, particularly for use in nuclear power plants, whose casing is divided into two chambers by a piston. The chambers are connected below and with a storage tank filled with hydraulic liquid via lines and valves, whereby the piston rod penetrates the casing wall, and the casing wall at this location has a seal which is adapted to the scope of the piston rod.

Hydraulic vibration brakes of this type are generally known and are used in industry for braking undesired component movements. For this reason, e.g., nuclear power plants provide steam generators which implement certain heat movements due to the large temperature differences, with vibration brakes. If undesired movement forces occur, e.g. due to earthquakes, the vibration brakes will block this movement and represent a rigid support, so that damage due to such undesired movement forces can be prevented. In nuclear power plants in particular the vibration brakes must be subjected to routine tests (inservice inspections) due to the strict safety requirements, in order to ensure their functional capability. In can not be assumed that the seal between the casing wall and the piston rod will be without leaks, following a certain time period, which could result in the loss of hydraulic liquid.

Safety precautions, therefore, always require continuous inspection of the vibration brakes during reactor operation. A continuous inspection of this type, is however, very costly.

Another disadvantage of the known vibration brake is that upon loss of hydraulic liquid, a shutdown of the reactor is necessary since its function is no longer ensured. This condition would of necessity reduce the availability of the plant.

It is therefore the function of the invention to provide a vibration brake which precludes a loss of liquid during normal operation and during plant accidents, and which would make continuous inspection during its utilization period unnecessary, but which would allow a periodic inspection of its seals and valves while the reactor is shut down.

The problem is solved in that a bellows is attached to one side of the casing and at the free end of the piston rod, in that the bellows limits the chamber which is connected with other chambers and the storage tank via conduits, in that other chambers can be supplied with pressure for periodic inspection of valves and seals, and in that leak measuring equipment will indicate a leak.

To supply pressure, the chambers have connection nozzles which are connected with a pump unit via conduits.

The circuit arrangement for periodic inspection of the valves and seals of the vibration brake shall be indicated in subclaims 3 through 7.

The hydraulic vibration brake under consideration is explained by means of a schematic drawing and the following description.

Vibration brake 1 consists of a casing 2 in which a piston 4 which is connected with a piston rod 3 is stored in such a way as to be mobile. Piston rod 3 and casing 2 are connected with the components 7, 8 via straps 5, 6 i.e. via through bolts 10 and bolts 11 in order to snub their impermissible movement in arrow direction 9, and to brake their impermissible movements. Pistons 4 and piston rod 3 are led across glide bearings 12 and 13. Two seals 14 and 14a separate the casing inner space into two chambers 15 and 16. At the point at which the piston rod protrudes beyond the casing 2 through the frontal face, chamber 16 is closed with the aid of seal 17. Seal 17 and glide bearing 13 are led in a u-shaped mounting 18 of casing 2. A bellows 21 is mounted at the end of casing 2 in the area of mounting 18. The bellows is also attached to the free end 19 of piston rod 3, so that it limits chamber 20. Chambers 15, 16, 20 are connected with the storage tank 27 and below one-another via conduits or lines 22, 23, 24, 25, 26. Valves 28, 28a are installed in lines 22, 23, which under heat-conditioned expansions of components 7, 8 could let a throttled liquid flow pass in a known manner. If, e.g. piston 4 moves in arrow direction 29, a throttled flow crosses through valve 28. The pressure equalization takes place via the throttle of valve 28a in the direction of chamber 16. If piston 4 moves in the direction 30, pressure equalization takes place in reverse order to chamber 15. Since chambers 15, 16 and 20 are all connected with the storage tank 27, the pressure in each chamber is equal to the pressure in the storage tank. In this way, all possible leaks are also equalized at seals 14, 17. Due to the equal pressure in the chambers, leaks between the chambers are precluded. A leak towards the outside can also not occur since no outer seals are present due to the studied bellow design. If an undesired whipping movement of the piston occurs, which could be caused by an earthquake or a pipe break, one of the valves 28, 28a, depending upon the direction of movement of the piston, is closed due to the excessive pressure, so that there will be a sturdy support between components 7, 8.

To inspect the seals and valves while the reactor is shut down, chambers 15, 16 at the connection nozzles 45, 46 can be supplied with pressure by means of a mobile pump unit 31, via line 32. Hydraulic liquid from the vibration brake is used as a pressure medium. Isolation valves 33, 34, 35 are installed in lines 24, 25. Lines 22, 23, 24 have branches 36, 37, 38 which lead to leak measuring equipment 39, 40, 41, and which can be isolated by means of valves 42, 43, 44.

The tests which are possible using the studied leak measuring equipment are listed in the following table.

| Component to be inspected | Test Pressure in Chambers | Isolation Valve 33 | 34 | 35 | Leak Measuring Device 39 | 40 | 41 |
|---|---|---|---|---|---|---|---|
| Valve 28 | 15 | closed | closed | closed | open | closed | closed |
| Valve 28a | 16 | closed | closed | open | closed | open | closed |
| Piston Rod Seal 17 | 16 | closed | closed | closed | closed | closed | open |
| Pistion 14 | 15 | closed | closed | closed | closed | open | closed |
| Seal 14a | 16 | closed | closed | open | open | closed | closed |

The advantage of the equipment under consideration is that at least during normal operation and during all accidents of the vibration brakes, no hydraulic liquid is lost at the seals, so that the vibration brake always has sufficient hydraulic liquid for its utilization as a sturdy support.

This makes an inspection during reactor operation superfluous. The remote-controlled planned inspection of the seals with the aid of the studied leak measuring during the shutdown periods of the reactor system is sufficient.

We claim:

1. A hydraulic brake for dampening motion between a first structure and a second structure comprising:
   a casing having a first casing end and a second casing end; said first casing end being fixable to the first structure;
   a piston slidably disposed within said casing between said first casing end and said second casing end to divide said casing into a first chamber and a second chamber;
   a piston rod having a first rod end and a second rod end, said first rod end being connected to said piston, said piston rod extending through said second chamber and further extending slidably through said second casing end;
   said second rod end being fixable to the second structure;
   a bellows being sealably attached to said second rod end and sealably attached to said second casing end to form a third chamber containing said piston rod protruding from said casing;
   piston sealing means for precluding fluid communication between said first chamber and said second chamber around said piston;
   casing sealing means to preclude fluid communication between said second chamber and said third chamber around said piston rod;
   a hydraulic fluid reservoir;
   said first chamber, said second chamber, said third chamber, and said reservoir being filled with hydraulic fluid at a common pressure;
   conduit means for providing fluid communication between said first chamber, said second chamber, said third chamber and said reservoir;
   isolation valve means for selectively isolating said first chamber, said second chamber and said third chamber from said reservoir and from each other;
   throttling valve means for throttling the rate of fluid flow through said conduit means;
   pressure means for selectively supplying pressure to said first chamber and said second chamber; and,
   pressure detection means for selectively detecting and indicating pressure of said first chamber, said second chamber and said third chamber.

2. A hydraulic brake as in claim 1 wherein said pressure means include:
   a first pump in fluid communication with said first chamber via a first chamber pressure pipe and a first chamber pressure nozzle penetrating the wall of said casing at said first chamber; and
   a second pump in fluid communication with said second chamber via a second chamber pressure pipe and a second chamber pressure nozzle penetrating the wall of said casing at said second chamber.

3. A hydraulic brake as in claim 1 wherein said conduit means includes:
   a common conduit;
   a first chamber conduit providing fluid communication between said first chamber and said common conduit;
   a second chamber conduit providing fluid communication between said second chamber and said common conduit;
   a third chamber conduit providing fluid communication between said third chamber and said common conduit;
   said second chamber conduit communicating with said common conduit at a point between the points of communication of said first chamber conduit and said second chamber conduit with said common conduit;
   a reservoir conduit providing fluid communication between said reservoir and said common conduit at a point between the points of communication of said second conduit and said third conduit with said common conduit;
   said isolation valve means including
     a first chamber isolation valve positioned on said common conduit between said first chamber conduit and said second chamber conduit,
     a second chamber isolation valve positioned on said commond conduit between said second chamber conduit and said reservoir conduit, and
     a third chamber isolation valve positioned on said third chamber conduit;
   said throttling valve means including
     a first throttle valve positioned on said first chamber conduit, and
     a second throttling valve positioned on said second chamber conduit, and,
   said pressure detection means including
     a first isolatible detector in fluid communication with said first chamber conduit between said common conduit and said first throttling valve,
     a second isolatible detector in fluid communication with said second chamber conduit between said common conduit and said second throttling valve, and,
     a third isolatible detector in fluid communication with said third chamber conduit between said third isolation valve and said third chamber.

4. A hydraulic brake as in claim 3 wherein:
   said first chamber isolation valve, said second chamber isolation valve and said third chamber isolation valve are closed; and,
   said first chamber is pressurized by said pressurizing means to enable testing of said first throttling valve with said first detector.

5. A hydraulic brake as in claim 3 wherein:
   said first chamber isolation valve and said second chamber isolation valve are closed;
   said third chamber isolation valve is open; and,
   said second chamber is pressurized by said pressurizing means to enable testing of said second throttling valve with said second detector.

6. A hydraulic brake as in claim 3 wherein:
   said first chamber isolation valve, said second chamber isolation valve and said third chamber isolation valve are closed; and,
   said second chamber is pressurized by said pressurizing means to enable testing of said casing sealing means with said third detector.

7. A hydraulic brake as in claim 3 wherein:

said piston sealing means includes a first seal to seal said piston with respect to said first chamber and a second seal to seal said piston with respect to said second chamber.

8. A hydraulic brake as in claim 7 wherein:
said first chamber isolation valve, said second chamber isolation valve and said third chamber isolation valve are closed; and,
said first chamber is pressurized by said pressurizing means to enable testing of said first piston seal with said second detector.

9. A hydraulic brake as in claim 7 wherein:
said first chamber isolation valve and said second chamber isolation valve are closed;
said third chamber isolation valve is opened; and,
said second chamber is pressurized by said pressurizing means to enable testing of said second piston seal with said first chamber detector.

* * * * *